United States Patent [19]

Snitzer et al.

[11] 4,397,961
[45] Aug. 9, 1983

[54] COMPOSITE BONDING

[75] Inventors: Elias Snitzer, West Hartford; James F. Bacon, Manchester, both of Conn.

[73] Assignee: United Technologies Corporation, Hartford, Conn.

[21] Appl. No.: 338,822

[22] Filed: Jan. 11, 1982

Related U.S. Application Data

[62] Division of Ser. No. 215,282, Dec. 12, 1980, Pat. No. 4,353,966.

[51] Int. Cl.$^3$ ............................ C03C 3/08; C03C 3/10
[52] U.S. Cl. .......................................... 501/15; 501/17; 501/32
[58] Field of Search ............................... 501/15, 17, 32

[56] References Cited
U.S. PATENT DOCUMENTS 2,969,293  1/1961  Smith ..................................... 501/17
4,186,023  1/1980  Dumesnil et al. ..................... 501/15
4,256,378  3/1981  Prewo et al. .......................... 501/95
4,263,367  4/1981  Prewo .................................... 428/338
4,265,968  5/1981  Prewo .................................... 428/336

*Primary Examiner*—Mark Bell
*Attorney, Agent, or Firm*—Harry J. Gwinnell

[57] ABSTRACT

A process of bonding a plurality of thermally stable, high strength graphite fiber reinforced glass matrix composite materials is described. The process comprises applying to the surface of at least one of the composite materials to be bonded, a mixture of low softening point glaze such as high lead oxide containing glaze, a high melting point low coefficient of thermal expansion material such as beta-spodumene and colloidal silica followed by hot pressing the composite materials to be bonded together. The resultant bonded articles and the glass compositions particularly adapted for this bonding process are also described.

3 Claims, No Drawings

COMPOSITE BONDING

The Government has rights in this invention pursuant to Contract No. NAS1-14346 awarded by the National Aeronautics and Space Administration.

This is a division of application Ser. No. 215,282 filed on Dec. 12, 1980, now U.S. Pat. No. 4,353,966.

CROSS REFERENCE TO RELATED APPLICATIONS

Attention is directed to commonly assigned, copending U.S. patent application Ser. No. 215,283, filed Dec. 12, 1980, now U.S. Pat. No. 4,350,744, entitled "Metallic Solder Composite Bonding" which discloses a method of bonding fiber reinforced composite materials.

Attention is also directed to commonly assigned, copending U.S. patent application Ser. No. 215,281, filed Dec. 12, 1980, now U.S. Pat. No. 4,358,512 entitled "Metal Composite Bonding" which discloses a method of bonding graphite fiber reinforced glass and metal.

1. Technical Field

The field of art to which this invention pertains is adhesive bonding and specifically adhesive bonding of composite materials.

2. Background Art

A new class of composite materials has recently appeared in the composite art. This new material is graphite fiber reinforced glass. This new material, as described in commonly assigned copending U.S. patent applications Ser. Nos. 54,098, filed July 2, 1979, now U.S. Pat. No. 4,256,378; 92,168, filed Nov. 7, 1979; and 135,375, filed Mar. 28, 1980, now U.S. Pat. No. 4,265,968 has many improved properties such as thermal conductivity, flexural strength, impact resistance, and thermal stability. These materials are generally hot pressed as an admixture of graphite fibers of particular fiber orientation in particulate glass. Therefore, there is generally little difficulty in forming this material in any desired shape prior to hot pressing. Furthermore, it is also possible to hot press the intermediately formed composite into the desired design shape. However, for some applications it is necessary to bond various pieces of these preformed, hot pressed composite materials together. Attempts at using conventional bonding materials such as epoxy, while meeting with limited success, are not compatible with the high temperature use some of these composite materials are primarily designed for and particularly adapted to, although for some less strenuous applications conventional adhesives could be quite acceptable. Other attempts at forming usable bonded composite materials have included utilizing the glass matrix of the composite to effect a bond. Here also, while such attempts have met with limited success, the strength of the bond while adequate for some uses, has proven to be inadequate for the rigorous environments the composite materials are adapted to and were specifically designed for. The materials properties (such as expansion coefficient and softening point) for the matrix material are different from those for the bond material in order to produce high strength bonds.

Accordingly, what is needed in the art is a bonding method for fiber reinforced composites, and specifically graphite fiber reinforced glass composites, which provides a bond which maintains the strength and thermal properties of the composite.

DISCLOSURE OF INVENTION

The present invention is directed to a method of bonding a plurality of thermally stable high strength graphite fiber reinforced glass matrix composite materials. The process comprises applying to the surface of at least one of the composite materials to be bonded a mixture of a low softening point glaze, and a high softening point low coefficient of thermal expansion material. After application of the bonding material, the composite surfaces to be bonded are placed in contact with each other and hot pressed to form the bonded composite.

Another aspect of the invention includes the bonded composite articles made according to the above recited process.

Another aspect of the invention includes a glass composition particularly adapted to bonding thermally stable, high strength graphite fiber reinforced glass matrix composite materials comprising a mixture of low coefficient of thermal expansion, high lead oxide containing glaze, low coefficient of thermal expansion beta-spodumene, and colloidal silica.

The foregoing, and other features and advantages of the present invention, will become more apparent from the following description.

Best Mode for Carrying Out the Invention

All percents recited herein are percents by weight. An essential component of the bonding composition of the present invention as described above is the low softening point glaze, preferably high lead oxide containing glaze. By high lead oxide content is meant about 40% to 60% lead oxide, and preferably about 50%. The glaze also contains low (less than 2%) or no alumina or zirconia. Other material components of the glaze include boric oxide ($B_2O_3$) about 16%, and silica ($SiO_2$) about 28%. A particularly suitable glaze having the requisite property requirements according to the present invention is Drakenfeld E-1576 (Drakenfeld Colors, Division of CIBA-Geigy). This glaze has a lead oxide content of about 50%, a thermal expansion of about $52 \times 10^{-7}$ cm/cm°C. and has a low softening point such that it fires to the glassy state at about 638° C. in about 15 minutes.

The second essential component of the composition of the present invention is a high softening point, low coefficient of thermal expansion material, preferably beta-spodumene ($LiAlSi_2O_6$). This component has a low coefficient of thermal expansion over the temperature range of 0° C. to 700° C. This expansion coefficient is less than $1 \times 10^{-6}$ cm/cm°C.

The third component which is preferably included in the composition according to the present invention is colloidal silica. The colloidal silica in minor amounts aids in the dissolution of the ingredients to form the improved bond. A preferred colloidal silica to produce the improved bond according to the present invention is Ludox (Dupont de Nemours and Co., Inc.).

The relative proportions of the materials according to the present invention is also important for obtaining the improved bond. Approximately equal amounts of the high lead oxide containing glaze and beta-spodumene are used (±5%) with a minor amount (up to 10%) of colloidal silica. While proportions outside these ranges may be used and still produce some bonding, it is important for obtaining the improved bonded composite properties that the specified materials be used in the specified proportions. The preferred composition comprises about 47% to 50% high lead oxide content glaze, about 46% to 49% beta-spodumene, and about 1% to 7% colloidal silica.

The bond according to the present invention is specifically designed to have a coefficient of thermal expansion close to, but not the same as the glass matrix material. Mismatching up to about 10% can be tolerated, the optimum requirement being a function of the geometry of the pieces to be bonded, but in most cases is best accomplished with the higher thermal expansion being the characteristic of the bond material rather than the glass matrix material so that the compressive forces are produced in the glass matrix rather than the bond. Accordingly, the components of the bond material are selected with this factor in mind.

The bonding composition according to the present invention may be applied by a variety of methods. However, the preferred method is coating either one or all of the composite pieces to be bonded. The bonding coatings may be applied as a single layer or a plurality of layers with air drying between the application of each layer. These coatings may be applied by brushing, roller application or spraying. They are also preferably air dried prior to bonding following the coating application.

It is also important for obtaining the improved bonding according to the present invention that the bonding compositions be applied in very thin layers to the pieces to be bonded. As stated above, brushing or rollers may be used with spraying being the preferred method of application because of the thinness a sprayed coat provides. The coatings should be applied as thin as possible, e.g. less than 1 mil.

Once the bond coatings have been applied to the pieces to be joined, bonding is performed by hot pressing the composite-bond materials. Generally, pressures up to about 300 psi ($2.07 \times 10^6$ NT/M$^2$) are used at temperatures between about 700° C. and 800° C. and preferably about 750° C. The key to bonding, however, is the use of temperatures sufficient to produce a transition liquid phase in the bonding material. By transition liquid phase is meant the bonding composition becomes sufficiently liquid to allow the individual components to dissolve in one another at the bonding temperature and once dissolved (and solidified as by cooling), they will not liquify at the low temperature at which the glaze liquifies, and furthermore will have an expansion coefficient which is appropriate for producing a strong bond with the composite material.

Sufficient pressure should also be used to cause spreading of the bonding composition during the transition liquid phase to cause as much composite-bond-composite contact as possible during this liquid phase and solidification. An inert gas atmosphere is also used to prevent detrimental oxidation of the bonding composition during the bonding process. The above hot pressing can generally be accomplished in less than one hour and preferably in about 20 minutes time.

To demonstrate the improved bonding characteristics of the compositions according to the present invention, five sample bonding compositions were prepared and applied to graphite fiber reinforced glass matrix composite pieces. The pieces were then bonded and tested for bond strength.

TABLE

| Slurry | Composition |
|---|---|
| A | 25 gms, Drakenfeld E-1576 |
|   | in 100 ml isopropyl alcohol |
| B | 25 gms, Drakenfeld E-1576 |
|   | 25 gms C.G.W. 7913 |
|   | 2 gms Ludox |
|   | 200 ml isopropyl alcohol |
| C | 25 gms of Drakenfeld E-1576 |
|   | 25 gms Al-95 |
|   | 2 gms Ludox |
|   | 200 ml isopropyl alcohol |
| D | 25 gms of PEMCO PB-461 |
|   | 25 gms Al-95 |
|   | 2 gms Ludox |
|   | 200 ml isopropyl alcohol |
| E | 25 gms of C.G.W. 7740 |
|   | 2 gms Ludox |
|   | 100 ml isopropyl alcohol |

Drakenfeld E-1576 is as described above, a high lead oxide containing glaze containing approximately 50% lead oxide, about 16% boric oxide, and about 28% silica. C.G.W. 7913 is a high temperature stable glass composition containing about 96% silica. Ludox is as described above, a colloidal silica. AL-95 is a product of Research Organic/Inorganic Chemical Corporation, Sun Valley, Calif. and comprises 98% beta-spodumene. PEMCO Pb-461 is a product of PEMCO Products and comprises approximately 43.2% PbO, 21.9% $B_2O_3$ and 34.9% $SiO_2$, and has a coefficient of thermal expansion of $52 \times 10^{-7}$ cm/cm°C. It should be noted that the percentages of components of slurry D comprise 48.5% high lead oxide content glaze, 47.6% beta-spodumene and 3.9% colloidal silica.

EXAMPLE 1

Two pieces of graphite fiber (0°, 90° orientation) reinforced borosilicate glass approximately 1.375 inches (3.493 cm) square and 0.25 inch (0.64 cm) thick were coated with slurry A of the Table. The surfaces coated were then dried in air under a heat lamp and placed in a furnace with the painted surfaces in contact. The pieces were then heated in an air atmosphere in a furnace at 640° C. for 20 minutes under 5 pounds ($2.3 \times 10^3$ grams) of pressure (a weight placed on the sample). The sample remained in the furnace and was allowed to gradually cool to room temperature. Upon removal from the furnace the bonded composite could be cut, ground and survived a drop test a distance of several feet without bond separation.

EXAMPLE 2

Two pieces of graphite reinforced glass as described in Example 1 were coated with a thin layer of slurry B from the Table. The coated surfaces of the two pieces were then air dried with a heat lamp. The pieces were placed coated sides together under a pressure of about 300 psi ($2.069 \times 10^6$ NT/M$^2$) and heated for 20 minutes at a temperature of about 750° C. Heating was performed in an oven under an inert atmosphere, i.e. argon gas. The bonded composite was allowed to cool as in Example 1. As with Example 1, the bonded composite survived grinding and a drop test and appeared to be well bonded.

EXAMPLE 3

Two samples of discontinuous graphite fiber reinforced glass approximately 1.375 inches (3.493 cm) square and 0.55 inch (1.397 cm) thick were coated with slurry C of the Table. The coated surfaces were dried as in Example 1 and heated at the same pressure, time, temperatures and argon gas atmosphere as in Example 2. The specimen was allowed to cool as in Examples 1 and 2 and appeared well bonded, survived a drop test and grinding.

EXAMPLE 4

Two pieces of graphite fiber reinforced glass as described in Example 1 approximately 1.375 inches 3.493 cm) square and 0.44 inch (1.12 cm) thick were coated with slurry D of the Table. The same conditions for bonding of Examples 2, 3 and 4 were used here except that the temperature was slightly higher (about 800° C.) than the other examples. The pieces also appeared to be well bonded and survived grinding and a drop test.

EXAMPLE 5

Two pieces of graphite fiber reinforced glass as described in Example 4 were coated with slurry E of the Table and dried and bonded as described in Examples 2–4 except for the use of a slightly higher temperature (1000° C.). The bonded composite was subjected to a drop test and grinding, however, the specimen did not appear to be well bonded. The bonding coating appeared to have bubbled and accordingly, further testing was not performed.

The samples of Examples 1 through 4 were further tested by a short beam shear test. The short beam shear test was performed by supporting the samples on two points 1 inch (2.54 cm) apart and applying pressure from a third point on the opposite side of the sample equidistant from the other two points. The bonded composites of Examples 1 and 2 sheared at the bond at about $1.4 \times 10^3$ pounds per square inch ($9.84 \times 10^5$ kgs. per square meter) and 2 to $2.5 \times 10^3$ pounds per square inch (1.41 to $1.76 \times 10^6$ kgs. per square meter), respectively. The bonded samples of Example 4 failed at about $3 \times 10^3$ pounds per square inch ($2.11 \times 10^6$ kgs. per square meter). Failure was evidenced by a slip in the bond area as opposed to the shear of the bond of Examples 1 and 2. The bond of Example 3 did not fail at testing up to $10 \times 10^3$ pounds per square inch ($7.03 \times 10^6$ kgs. per square meter). At this pressure, even though the bond still held, there was compression and flexural strength failure of the composite itself, however. In fact, such composite failure was noted as low as $7 \times 10^3$ pounds per square inch ($4.92 \times 10^6$ kgs per square meter) in some samples made according to this example.

While this bonding process has been described for graphite fiber reinforced glass composites, the process according to the present invention may be used for any fiber reinforced glass or glass-ceramic or ceramic composite. Specifically, the process is designed for bonding those composites disclosed in commonly assigned copending U.S. patent applications Ser. Nos. 54,098, filed July 2, 1979; 92,168, filed Nov. 7, 1979; and 135,375, filed Mar. 28, 1980, the disclosures of which are incorporated by reference.

As described in the above patent applications, while any graphite fiber with the requisite high strength and good modulus of elasticity can be used in the composites of this invention, such as Hercules HMS graphite fiber, Celanese GY-70 (formerly DG102) graphite fibers are particularly suitable. This fiber consists of 384 fibers/tow and has an oxidixed finish. It is 8 microns in diameter, has a modulus of elasticity of 531 GPa ($77 \times 10^6$ psi). It has a tensile strength of 1724 MPa ($250 \times 10^3$ psi) and a density of 1.96 gm/cm$^3$. The fiber is used at about 40 to 70% by volume based on the graphite-glass composite and preferably at about 60% by volume. Also, as described in these applications, the glass used in the composites of the present invention is particularly selected to have a very low coefficient of thermal expansion preferably matched closely, but not equal to that of the graphite fibers used since the graphite has a highly negative axial coefficient of thermal expansion, and the glass has a positive but small coefficient of thermal expansion. Particularly suitable for the purposes of this invention is a borosilicate glass (Corning Glass Works 7740) with an anneal point of 500° C., a softening point of 821° C., a liquidus temperature of 1017° C., a density of 2.23 grams per cubic centimeter, an index of refraction of 1.474, a dielectric constant of 4.6, a coefficient of linear expansion of $32.5$ cm/cm°C.$\times 10^{-7}$ and a modulus of elasticity of $9.1 \times 10^6$ psi ($6.3 \times 10^7$ NT/M$^2$). The particle size of the glass should be such that at least 90% passes through a 36.0 mesh screen.

The main advantage of the bonding material of the present invention is that it allows fabrication and flexibility in design of the graphite reinforced glass composites described in the above recited patent applications without sacrifice in the improved strength, impact resistance and thermal stability of the composite material. For example, the resulting bond between composite pieces has a thermal expansion less than $25 \times 10^{-7}$ cm/cm°C. with stability over a wide range of temperature conditions. The bond strengths in excess of $10 \times 10^3$ pounds per square inch ($7.03 \times 10^6$ kgs/M$^2$) are significant for any bonding material excluding the difficult bondability of the graphite fiber reinforced glass composites of the present invention.

Although this invention has been shown and described with respect to detailed embodiments thereof, it will be understood by those skilled in the art that various changes in form and detail thereof may be made without departing from the spirit and scope of the claimed invention.

We claim:

1. A glass composition particularly adapted to bonding graphite fiber reinforced glass matrix composite materials together consisting essentially of about 47% to about 50% by weight of a low coefficient of thermal expansion, high lead oxide content glaze containing about 40% to about 60% by weight lead oxide, about 46% to about 49% by weight low coefficient of thermal expansion beta-spodumene, and about 1% to about 7% by weight colloidal silica.

2. The composition of claim 1 wherein the lead oxide glaze contains about 16% by weight boric oxide and about 28% by weight silica.

3. The composition of claim 1 wherein the high lead oxide glaze has a thermal expansion coefficient of about $52 \times 10^{-7}$ cm/cm°C., and the beta-spodumene has a thermal expansion coefficient less than $1 \times 10^{-6}$ cm/cm°C. from room temperature to 700° C.

* * * * *